(12) United States Patent
Yan et al.

(10) Patent No.: US 11,184,646 B2
(45) Date of Patent: Nov. 23, 2021

(54) 360-DEGREE PANORAMIC VIDEO PLAYING METHOD, APPARATUS, AND SYSTEM

(71) Applicant: HUAWEI TECHNOLOGIES CO., LTD., Guangdong (CN)

(72) Inventors: Guoxiong Yan, Shenzhen (CN); Xiaohui Bie, Shenzhen (CN); Xiaojun Duan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 6 days.

(21) Appl. No.: 16/434,387

(22) Filed: Jun. 7, 2019

(65) Prior Publication Data
US 2019/0289337 A1   Sep. 19, 2019

Related U.S. Application Data

(63) Continuation of application No. PCT/CN2017/099542, filed on Aug. 29, 2017.

(30) Foreign Application Priority Data

Dec. 7, 2016   (CN) .......................... 201611118333.X

(51) Int. Cl.
*H04N 21/218* (2011.01)
*H04N 5/232* (2006.01)
(Continued)

(52) U.S. Cl.
CPC ... *H04N 21/21805* (2013.01); *H04N 5/23238* (2013.01); *H04N 21/25841* (2013.01);
(Continued)

(58) Field of Classification Search
CPC ......... H04N 21/21805; H04N 21/8133; H04N 21/25841; H04N 21/23238
(Continued)

(56) References Cited

U.S. PATENT DOCUMENTS

2015/0256746 A1   9/2015   Macmillan et al.

FOREIGN PATENT DOCUMENTS

| CN | 101082926 A | 12/2007 |
|---|---|---|
| CN | 102833525 A | 12/2012 |

(Continued)

OTHER PUBLICATIONS

Office Action issued in Chinese Application No. 201611118333.X dated Sep. 4, 2019, 4 pages.
(Continued)

*Primary Examiner* — On S Mung
(74) *Attorney, Agent, or Firm* — Fish & Richardson P.C.

(57) ABSTRACT

Embodiments of the present disclosure provide a 360-degree panoramic video playing method, an apparatus, and a system. The method includes: receiving, by a video player, a search instruction, and displaying, according to the search instruction, locating information of a 360-degree panoramic video, where the locating information includes descriptive information of playing content in multiple angle ranges of the 360-degree panoramic video, and the descriptive information is used for determining the playing content in the multiple angle ranges; and receiving a switching instruction, and switching a playing angle range of the 360-degree panoramic video from an angle range of current playing content to a first angle range according to the switching instruction, where the first angle range is an angle range selected by a user from the multiple angle ranges.

17 Claims, 11 Drawing Sheets

(51) Int. Cl.
- *H04N 21/258* (2011.01)
- *H04N 21/81* (2011.01)
- *H04N 21/472* (2011.01)
- *H04N 21/6587* (2011.01)
- *H04N 21/422* (2011.01)
- *H04N 21/431* (2011.01)
- *H04N 21/4728* (2011.01)

(52) U.S. Cl.
CPC ......... *H04N 21/422* (2013.01); *H04N 21/431* (2013.01); *H04N 21/472* (2013.01); *H04N 21/4728* (2013.01); *H04N 21/6587* (2013.01); *H04N 21/816* (2013.01); *H04N 21/8133* (2013.01)

(58) Field of Classification Search
USPC ........................................................ 348/143
See application file for complete search history.

(56) References Cited

FOREIGN PATENT DOCUMENTS

| | | |
|---|---|---|
| CN | 102945563 A | 2/2013 |
| CN | 103795976 A | 5/2014 |
| CN | 104010225 A | 8/2014 |
| CN | 104602129 A | 5/2015 |
| CN | 106127680 A | 11/2016 |
| CN | 106162204 A | 11/2016 |

OTHER PUBLICATIONS

PCT International Search Report and Written Opinion in International Application No. PCT/CN2017/099542, dated Nov. 20, 2017, 18 pages (With English translation).
Extended European Search Report issued in European Application No. 17878392.4 dated Jul. 22, 2019, 8 pages.
Neng, "360° Hypervideo," Mestrado Em Informatica, XP055183807, Jan. 1, 2011, 66 pages.
Neng et al., "Get Around 360° Hypervideo,", Proceedings of the 14th International Academic MindTrek Conference Envisioning Future Media Environments, XP055283042, Oct. 2010, 4 pages.

| |
|---|
| 0°–60°, human/foreground/moving/complex, 162 |
| 60°–120°, article/foreground/still/complex, 131 |
| 120°–180°, animal/background/moving/complex, 186 |
| 180°–240°, animal/background/still/simple, 158 |
| 240°–300°, human/background/still/complex, 112 |
| 300°–360°, other/background/still/simple, 78 |
FIG. 6c
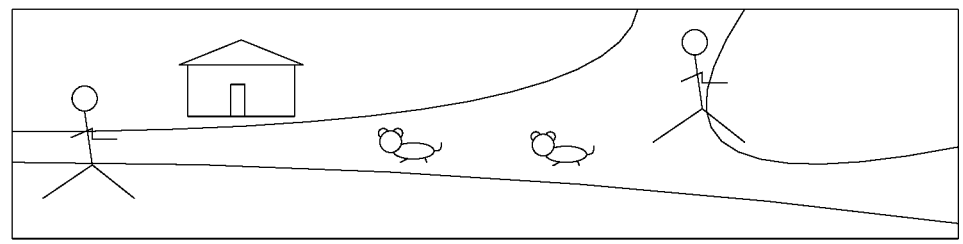
(1)
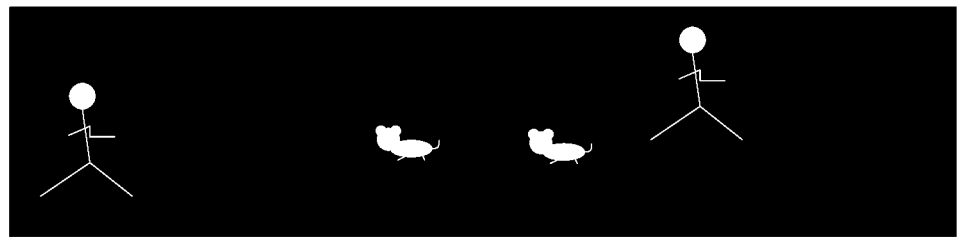
(2)
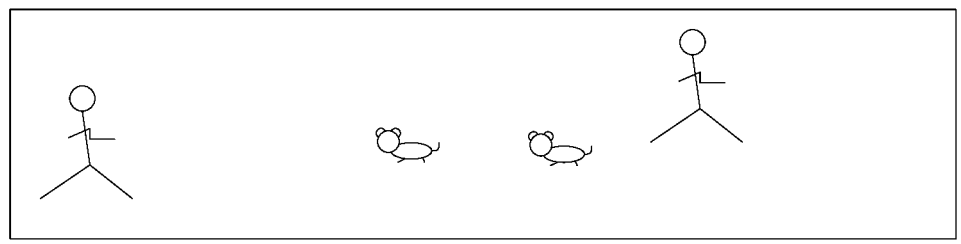
(3)
FIG. 6d

360-DEGREE PANORAMIC VIDEO PLAYING METHOD, APPARATUS, AND SYSTEM

CROSS-REFERENCE TO RELATED APPLICATIONS

This application is a continuation of International Application No. PCT/CN2017/099542, filed on Aug. 29, 2017, which claims priority to Chinese Patent 201611118333.X, filed on Dec. 7, 2016. The disclosures of the aforementioned applications are hereby incorporated by reference in their entireties.

TECHNICAL FIELD

This application relates to the field of image technologies, and in particular, to a 360-degree panoramic video playing method, an apparatus, and a system.

BACKGROUND

With popularization of terminals such as a smartphone, a tablet computer, a smart TV, and a VR/AR, a 360-degree panoramic video also becomes increasingly popular. A 360-degree panorama is a plane picture generated by mapping surrounding landscape based on a geometrical relationship, so that all real images in a horizontal 360-degree spherical range can be fully presented. This brings a sense of 3D three-dimensional space to a user. The 360-degree panoramic video created based on the 360-degree panorama includes comprehensive information, features good interaction, and therefore is widely applied.

Currently, all interaction manners of a video player are designed based on a plane scenario, and when viewing a 360-degree panoramic video, a user may view video content in only one angle range at a time. When the user needs to select video content in which the user is interested, the user may drag a picture of the 360-degree panoramic video on a video playing interface by using a mouse; and when browsing the video content in which the user is interested, the user may stop dragging the mouse temporarily, and view video content played on a current video playing interface. Some 360-degree panoramic videos further provide viewpoint information, and the user may click on the viewpoint information, and switches a playing angle range to an angle range corresponding to the viewpoint information, so as to view video content in the angle range corresponding to the viewpoint information. If the video content is not the content in which the user is interested, the user needs to click on the viewpoint information again, and switches the playing angle range again, until the user views the content in which the user is interested.

However, regardless of whether the user drags, by using the mouse, the picture of the 360-degree panoramic video to select the playing angle range in which the user is interested, or selects the playing angle range by playing the playing content in all angle ranges one by one, the user needs to perform a large quantity of operations. This causes low efficiency of switching the playing angle range by the user.

SUMMARY

Embodiments of the present invention provide a 360-degree panoramic video playing method, an apparatus, and a system, to improve efficiency of switching a playing angle range by a user, thereby improving user experience.

To achieve the foregoing objective, the following technical solutions are used in the embodiments of the present invention.

According to a first aspect, an embodiment of the present invention provides a 360-degree panoramic video playing method, where the method includes: receiving, by a video player, a search instruction, where the search instruction is used to instruct the video player to display locating information of a 360-degree panoramic video that is being played, and the locating information includes descriptive information of playing content in multiple angle ranges of the 360-degree panoramic video, and is used by a user to determine the playing content in the multiple angle ranges according to the descriptive information of the playing content in the multiple angle ranges; displaying, by the video player, the locating information according to the search instruction; receiving, by the video player, a switching instruction, where the switching instruction is used to instruct the video player to switch a playing angle range of the 360-degree panoramic video from an angle range of current playing content to a first angle range, and the first angle range is an angle range selected by the user from the multiple angle ranges; and switching, by the video player, the playing angle range of the 360-degree panoramic video from the angle range of the current playing content to the first angle range according to the switching instruction.

Based on the 360-degree panoramic video playing method provided in this embodiment of the present invention, when receiving the search instruction, the video player may display the locating information to the user. The locating information includes the descriptive information of the playing content in the multiple angle ranges of the 360-degree panoramic video, so that the user can determine the playing content in the multiple angle ranges according to the descriptive information of the playing content in the multiple angle ranges, and after receiving the switching instruction input by the user, the video player can directly switch the playing angle range of the 360-degree panoramic video from the angle range of the current playing content to the first angle range, that is, can directly switch the current playing angle range to the first angle range with the playing content in which the user is interested, while the user neither needs to drag a picture of the 360-degree panoramic video by using a mouse to select the playing angle range in which the user is interested, nor needs to switch the playing angle range to all viewpoints one by one. The playing angle range is selected by browsing the playing content, so that efficiency of switching the playing angle range by the user is improved.

In a possible design, the displaying, by the video player, the locating information according to the search instruction includes: displaying, by the video player according to the search instruction, the locating information on the current playing content by means of superimposition.

In this possible design, the locating information is displayed on the current playing content by means of superimposition, so that the user may view the locating information without stopping the current playing content temporarily.

In a possible design, before the receiving, by a video player, a search instruction, the method further includes: obtaining, by the video player, the locating information.

In a possible design, the descriptive information of the playing content in the multiple angle ranges includes image information of playing content in each of the multiple angle ranges; and the obtaining, by the video player, the locating information includes: performing, by the video player, angle range division on the 360-degree panoramic video, and determining the playing content in the multiple angle ranges; and performing, by the video player, image processing on the playing content in the multiple angle ranges, and obtaining the image information of the playing content in each angle range, to obtain the locating information.

In this possible design, a manner in which the video player voluntarily obtains the locating information is provided, to avoid an increase of bandwidth used for information transmission between the video player and the video server.

In a possible design, the obtaining, by the video player, the locating information includes: receiving, by the video player, the locating information sent by a video server.

In this possible design, a manner in which the video server provides the locating information is provided, to avoid power consumption of the video player.

According to a second aspect, an embodiment of the present invention provides a 360-degree panoramic video playing method, where the method includes: obtaining, by a video server, locating information of a 360-degree panoramic video, where the locating information includes descriptive information of playing content in multiple angle ranges of the 360-degree panoramic video, and is used by a user to determine the playing content in the multiple angle ranges according to the descriptive information of the playing content in the multiple angle ranges; and sending, by the video server, the locating information to a video player, so that the video player displays the locating information to the user in a process of playing the 360-degree panoramic video, and the user selects a playing angle range of the 360-degree panoramic video.

Based on the 360-degree panoramic video playing method provided in this embodiment of the present invention, the video server can obtain the locating information, and send the locating information to the video player, so that the video player can display the locating information to the user in a process of playing the 360-degree panoramic video. Because the locating information includes the descriptive information of the playing content in the multiple angle ranges of the 360-degree panoramic video, when the video player displays the locating information to the user, the user can learn the playing content in the multiple angle ranges according to the descriptive information of the playing content in the multiple angle ranges, and directly select an angle range corresponding to playing content in which the user is interested to switch to. That is, the user can directly switch a current playing angle range to the angle range with the playing content in which the user is interested, while the user neither needs to drag a picture by using a mouse to select the playing angle range in which the user is interested, nor needs to switch the playing angle range to all viewpoints one by one. The playing angle range is selected by viewing the playing content, so that efficiency of switching the playing angle range by the user is improved.

Based on the video playing method provided in this embodiment of the present invention, the video server can obtain the locating information of the 360-degree panoramic video, and send the locating information to the video player, so that the video player can display the locating information to the user in the process of playing the 360-degree panoramic video, and the user may determine the playing content in the multiple angle ranges according to the descriptive information that is of the playing content in the multiple angle ranges of the 360-degree panoramic video and that is in the locating information, and selects a playing angle of the 360-degree panoramic video, while the user does not need to successively view the playing content in each playing angle to select the playing content the user wants to view.

In a possible design, the descriptive information of the playing content in the multiple angle ranges includes image information of playing content in each angle range; and the obtaining, by the video server, the locating information of the 360-degree panoramic video includes: performing, by the video server, angle range division on the 360-degree panoramic video, and determining the playing content in the multiple angle ranges; and performing, by the video server, image processing on the playing content in the multiple angle ranges, and obtaining the image information of the playing content in each angle range, to obtain the locating information.

In a possible design, the descriptive information of the playing content in the multiple angle ranges includes a total quantity of viewers of the playing content in each angle range; and the obtaining, by a video server, locating information of a to-be-played 360-degree panoramic video includes: performing, by the video server, the angle range division on the 360-degree panoramic video; and counting, by the video server, the viewers of the playing content in each angle range, to obtain the locating information.

According to a third aspect, an embodiment of the present invention provides a video player, including: a receiving unit, configured to receive a search instruction, where the search instruction is used to instruct a display unit to display locating information of a 360-degree panoramic video that is being played, and the locating information includes descriptive information of playing content in multiple angle ranges of the 360-degree panoramic video, and is used by a user to determine the playing content in the multiple angle ranges according to the descriptive information of the playing content in the multiple angle ranges; the display unit, configured to display the locating information according to the search instruction received by the receiving unit, where the receiving unit is further configured to receive a switching instruction, where the switching instruction is used to instruct a switching unit to switch a playing angle range of the 360-degree panoramic video from an angle range of current playing content to a first angle range, and the first angle range is an angle range selected by the user from the multiple angle ranges; and the switching unit, configured to switch the playing angle range of the 360-degree panoramic video from the angle range of the current playing content to the first angle range according to the switching instruction received by the receiving unit.

In a possible design, the display unit is specifically configured to display, according to the search instruction, the locating information on the current playing content by means of superimposition.

In a possible design, the video player further includes an obtaining unit, and the obtaining unit is configured to: before the receiving unit receives the search instruction, obtain the locating information.

In a possible design, the obtaining unit is specifically configured to receive the locating information sent by a video server.

In a possible design, the descriptive information of the playing content in the multiple angle ranges includes image information of playing content in each of the multiple angle ranges; and the obtaining unit is specifically configured to: perform angle range division on the 360-degree panoramic video, and determine the playing content in the multiple angle ranges; and perform image processing on the playing content in the multiple angle ranges, and obtain the image information of the playing content in each angle range, to obtain the locating information.

For technical effects of the video player provided in this embodiment of the present invention, refer to technical effects of the first aspect or each optional manner of the first aspect, and details are not described herein again.

According to a fourth aspect, an embodiment of the present invention provides a video server, including:

an obtaining unit, configured to obtain locating information of a 360-degree panoramic video, where the locating information includes descriptive information of playing content in multiple angle ranges of the 360-degree panoramic video, and is used by a user to learn the playing content in the multiple angle ranges according to the descriptive information of the playing content in the multiple angle ranges; and a sending unit, configured to send the locating information to a video player, so that the video player displays the locating information to the user in a process of playing the 360-degree panoramic video, and the user selects a playing angle range of the 360-degree panoramic video.

In a possible design, the descriptive information of the playing content in the multiple angle ranges includes image information of playing content in each angle range; and the obtaining unit is specifically configured to: perform angle range division on the 360-degree panoramic video, and determine the playing content in the multiple angle ranges; and perform image processing on the playing content in the multiple angle ranges, and obtain the image information of the playing content in each angle range, to obtain the locating information.

In a possible design, the descriptive information of the playing content in the multiple angle ranges includes a total quantity of viewers of the playing content in each angle range; and the obtaining unit is specifically configured to: perform the angle range division on the 360-degree panoramic video; and count the viewers of the playing content in each angle range, to obtain the locating information.

For technical effects of the video server provided in this embodiment of the present invention, refer to technical effects of the second aspect or each optional manner of the second aspect, and details are not described herein again.

With reference to the first aspect to the fourth aspect, in a possible design, the descriptive information of the playing content in the multiple angle ranges includes the image information of the playing content in each of the multiple angle ranges and/or the total quantity of viewers of the playing content in each angle range.

According to a fifth aspect, an embodiment of the present invention provides a video player. The video player may implement a function performed by a video player in the method embodiment used in the foregoing first aspect. The function may be implemented by hardware, or may be implemented by hardware by executing corresponding software. The hardware or the software includes one or more modules corresponding to the foregoing function.

In a possible design, a structure of the video player includes a processor and a transceiver. The processor is configured to support the video player in performing a corresponding function in the foregoing method. The transceiver is configured to support the video player in communicating with another network element. The video player may further include a memory. The memory is configured to be coupled with the processor, and the memory stores a program instruction and data required by the video player.

According to a sixth aspect, an embodiment of the present invention provides a readable medium, including a computer readable instruction. When a processor of a video player executes the computer readable instruction, the video player performs the 360-degree panoramic video playing method according to any one of the foregoing first aspect or the possible implementations of the first aspect.

For technical effects of the video player provided in this embodiment of the present invention, refer to technical effects of the first aspect or each optional manner of the first aspect, and details are not described herein again.

According to a seventh aspect, an embodiment of the present invention provides a video server. The video server may implement a function performed by a video server in the method embodiment used in the foregoing second aspect. The function may be implemented by hardware, or may be implemented by hardware by executing corresponding software. The hardware or the software includes one or more modules corresponding to the foregoing function.

In a possible design, a structure of the video server includes a processor and a transceiver. The processor is configured to support the video server in performing a corresponding function in the foregoing method. The transceiver is configured to support the video server in communicating with another network element. The video server may further include a memory. The memory is configured to be coupled with the processor, and the memory stores a program instruction and data required by the video server.

According to an eighth aspect, an embodiment of the present invention provides a readable medium, including a computer readable instruction. When a processor of a video server executes the computer readable instruction, the video server performs the 360-degree panoramic video playing method according to any one of the foregoing second aspect or the possible implementations of the second aspect.

For technical effects of the video server provided in this embodiment of the present invention, refer to technical effects of the second aspect or each optional manner of the second aspect, and details are not described herein again.

According to a ninth aspect, an embodiment of the present invention provides a video playing system, including: the video player according to any one of the third aspect or the possible designs of the third aspect, and the video server according to any one of the fourth aspect or the possible designs of the fourth aspect; or the video player according to any one of the fifth aspect or the possible designs of the fifth aspect, and the video server according to any one of the seventh aspect or the possible designs of the seventh aspect.

BRIEF DESCRIPTION OF DRAWINGS

FIG. 6c is a third schematic flowchart of a locating information presentation manner according to an embodiment of the present invention;

FIG. 6d is a fourth schematic flowchart of a locating information presentation manner according to an embodiment of the present invention;

DESCRIPTION OF EMBODIMENTS

It should be noted that the terms "system" and "network" may be used interchangeably in this specification. The term "and" in this specification describes only an association relationship for describing associated objects and represents that three relationships may exist. For example, A and B may represent the following three cases: Only A exists, both A and B exist, and only B exists. In addition, the character "/" in this specification generally indicates an "or" relationship between the associated objects.

It should be understood that when ordinal numbers such as "first", "second", "third", and "fourth" are mentioned in the embodiments of the present invention, they are merely used for distinguishing unless they definitely show a sequence according to a context. In addition, the terms "include", "contain", and any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
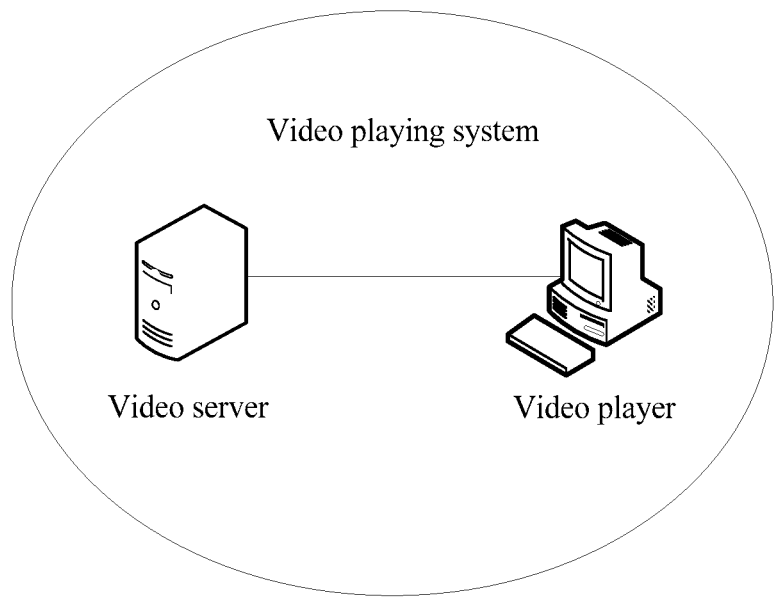
FIG. 1 is a block diagram of a video playing system according to an embodiment of the present invention.

A 360-degree panoramic video playing method provided in an embodiment of the present invention may be applied to a video playing system shown in FIG. 1. The video playing system includes a video server and a video player. The video server is configured to provide a video source of a 360-degree panoramic video to the video player, and the video player is a device configured to play the 360-degree panoramic video. The video player may be a terminal that can play the 360-degree panoramic video, such as a smartphone, a smart TV, a computer, a VR device, or an AR device.

Figure 2:
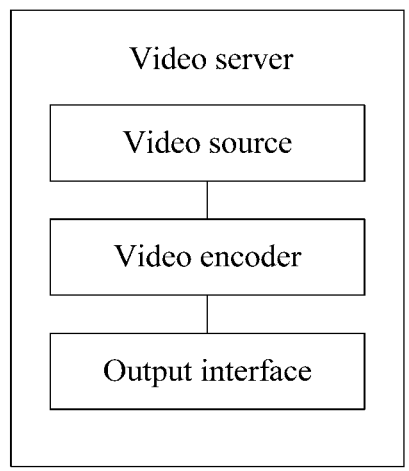
FIG. 2 is a first schematic structural diagram of a video server according to an embodiment of the present invention.

FIG. 2 shows a video server according to an embodiment of the present invention, including a video source, a video encoder, and an output interface. In some examples, the output interface may include a modem and/or a transmitter. The video source includes a video capture apparatus (for example, a video camera), a video file including previously captured video data, a video input interface that is configured to receive video data from a video content provider, and/or a computer graphics system that is configured to generate video data, or a combination of the foregoing video data sources. The video source is configured to provide video data of a to-be-played 360-degree panoramic video.

The video encoder can encode video data from the video source. The video server may send encoded video data to a video player by using the output interface. The encoded video data may further be stored in a storage medium or a file server for access by the video player, and the video player can decode and play the obtained encoded video data.

Figure 3:
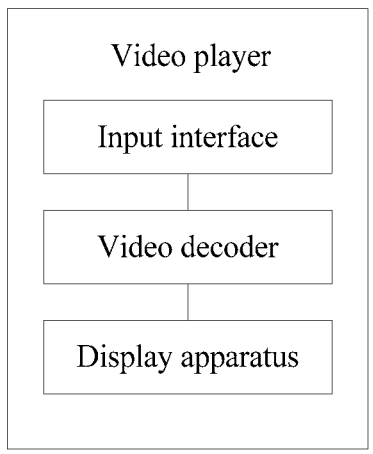
FIG. 3 is a first schematic structural diagram of a video player according to an embodiment of the present invention.

FIG. 3 shows a video player, including an input interface, a video decoder, and a display apparatus. In some examples, the input interface includes a receiver and/or a modem. The input interface is configured to receive encoded video data sent by a video server. The video decoder is configured to decode the encoded video data received by the input interface, to obtain decoded video data. The display apparatus is configured to display the decoded video data. The display apparatus may include multiple types of display apparatuses, such as a liquid crystal display (Liquid Crystal Display, LCD), a plasma display, an organic light-emitting diode (Organic Light-Emitting Diode, OLED) display, or another type of display apparatus.

Both the video encoder shown in FIG. 2 and the video decoder shown in FIG. 3 may be one or more microprocessors, a digital signal processor (Digital Signal Processor, DSP), an application-specific integrated circuit (Application-Specific Integrated Circuit, ASIC), a field-programmable gate array (Field-Programmable Gate Array, FPGA), discrete logic circuit, hardware, or a combination thereof. If a technology is partially or wholly implemented by using software, an apparatus may store an instruction of the software in an appropriate non-transitory computer readable storage medium, and may execute, by using one or more processors, an instruction in hardware to execute the technology in the present invention. Any one of the foregoing items (including hardware, software, a combination of the hardware and the software, and the like) may be considered as one or more processors. Both the video encoder and the video decoder may be included in one or more encoders or decoders, and any one of the video encoder and the video decoder may be integrated as a part of a combined coder/decoder (Coder Decoder, CODEC) in another apparatus.

Figure 4A:
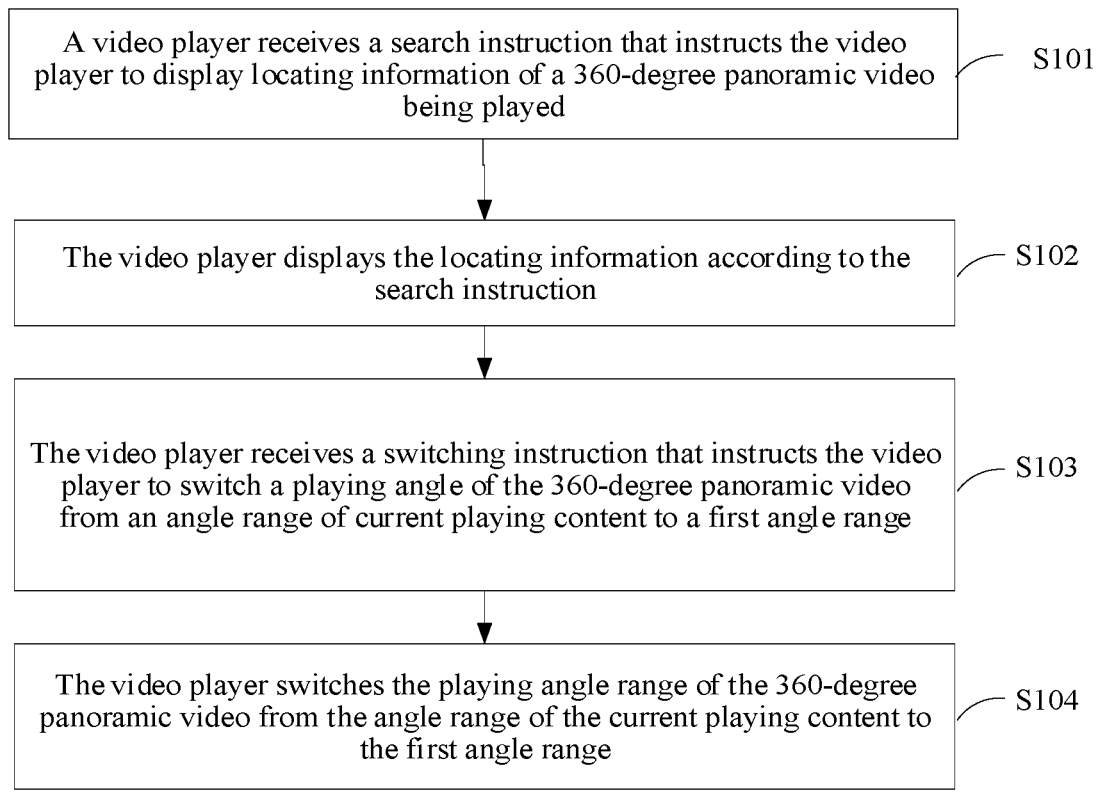
FIG. 4a is a first flowchart of a 360-degree panoramic video playing method according to an embodiment of the present invention.

Based on the video playing system shown in FIG. 1, as shown in FIG. 4a, an embodiment of the present invention provides a 360-degree panoramic video playing method. The method may include the following steps.

S101. The video player receives a search instruction, where the search instruction is used to instruct the video player to display locating information of a 360-degree panoramic video that is being played, and the locating information includes descriptive information of playing content in multiple angle ranges of the 360-degree panoramic video, and is used by a user to determine the playing content in the multiple angle ranges according to the descriptive information of the playing content in the multiple angle ranges.

In this embodiment of the present invention, angle range division may be performed on the 360-degree panoramic video. For example, every 60 degrees form an angle range, that is, the 360-degree panoramic video is divided into six angle ranges, and playing content in the six angle ranges forms the 360-degree panoramic video.

In an example, the descriptive information of the playing content in the multiple angle ranges includes image information of playing content in each of the multiple angle ranges and/or a total quantity of viewers of the playing content in each angle range.

The image information of the playing content in the angle range is used to describe a specific image of the playing content in the angle range. For example, the image information may be used to describe the following content: whether the playing content in the angle range is a foreground image or a background image, whether there is a human, an animal and/or an article, whether the playing content is a moving picture or a still picture, or whether the playing content is an image of complex textures or simple textures. If there is a human, an animal, and/or an article in the playing content in the angle range, the image information may further include enclosure box information of the human, the animal, and/or the article.

Alternatively, the image information may be information that is used to describe importance of an image of the playing content in the angle range. That is, a score of the image of the playing content in the angle range may be calculated according to a preset weight coefficient, and the importance of the image of the playing content in the angle range is represented by using the score. For example, when there is a human, an animal, and/or an article in the playing content in the angle range, or the playing content in the angle range is a foreground image, or when the playing content in the angle range is a moving picture, a weight coefficient of the playing content in the angle range is 1.0; when the playing content in the angle range is a still picture, a weight coefficient of the playing content in the angle range is 0.8; or when the playing content in the angle range is a background image, a weight coefficient of the playing content in the angle range is 0.2.

A total quantity of viewers of playing content in an angle range may be represented by a quantity of viewers who select to view playing content in each angle range when multiple users are viewing the 360-degree panoramic video. It may be understood that a larger quantity of viewers of a playing content in an angle range may represent that the playing content in the angle range is more wonderful (for example, the playing content is hot content). Therefore, a total quantity of viewers of playing content in each angle range may be provided, so that a user may select an angle range with playing content viewed by a larger quantity of people as a playing angle range.

In this embodiment of the present invention, based on the descriptive information of the playing content in each angle range, a user may quickly learn the playing content in each angle range, and can select a playing angle range according to playing content in which the user is interested.

It may be understood that in a process of playing the 360-degree panoramic video, the user may input a search instruction at any time during playing of the 360-degree panoramic video, so as to find a playing angle of content in which the user is interested, and switch the playing angle.

S102. The video player displays the locating information according to the search instruction.

Optionally, the video player may display, according to the search instruction, the locating information on the current playing content by means of superimposition.

For example, the locating information may be displayed in a partial area on a playing interface, and the area may be located at any location on the playing interface. For example, the area is located in a center of the playing interface, in a lower center of the playing interface, or in a lower right part of the playing interface. This is not limited in this embodiment of the present invention.

Figure 5:
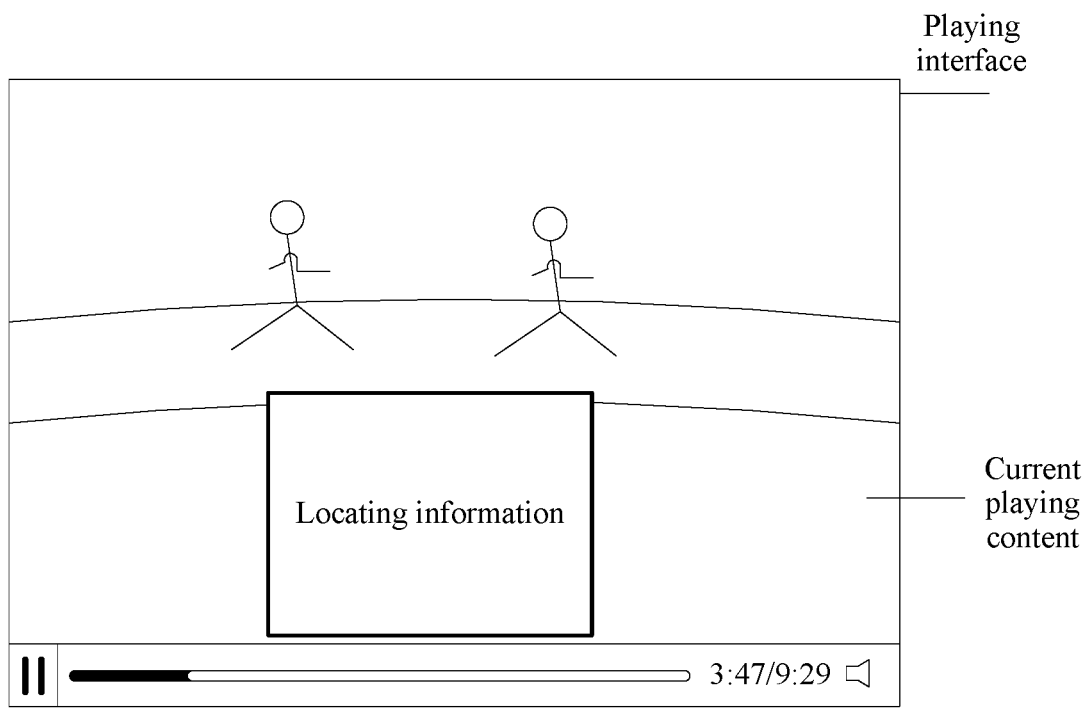
FIG. 5 is a schematic flowchart of a locating information display manner according to an embodiment of the present invention.

It should be noted that when the video player receives the search instruction, the current playing content on the playing interface of the video player may be stopped temporarily, or may continue to be played. For example, as shown in FIG. 5, in the lower center of the playing interface, the locating information is displayed on the current playing content by means of superimposition.

Further, in this embodiment of the present invention, the video player may present the locating information in multiple manners, for example, may present the locating information by using words, a diagram, a compass image, or a thumbnail.

The following describes a locating information presentation manner with reference to an example.

It is assumed that at a specific time during playing of the 360-degree panoramic video, the video player receives a search instruction input by a user. In this case, image information of playing content in an angle range 0°-60° of the 360-degree panoramic video is human/foreground/moving/complex (that is, representing a foreground image and moving picture with a human and complex textures), and a total quantity of viewers is 162; image information of playing content in an angle range 60°-120° is article/foreground/still/complex, and a total quantity of viewers is 131; image information of playing content in an angle range 120°-180° is human/foreground/moving/complex, and a total quantity of viewers is 186; image information of playing content in an angle range 180°-240° is animal/background/still/simple, and a total quantity of viewers is 158; image information of playing content in an angle range 240°-300° is human/background/still/complex, and a total quantity of viewers is 112; and image information of playing content in an angle range 300°-360° is other/background/still/simple, and a total quantity of viewers is 78. The following describes a presentation manner of the locating information of the 360-degree panoramic video with reference to FIG. 6a to FIG. 6d.

Figure 6A:
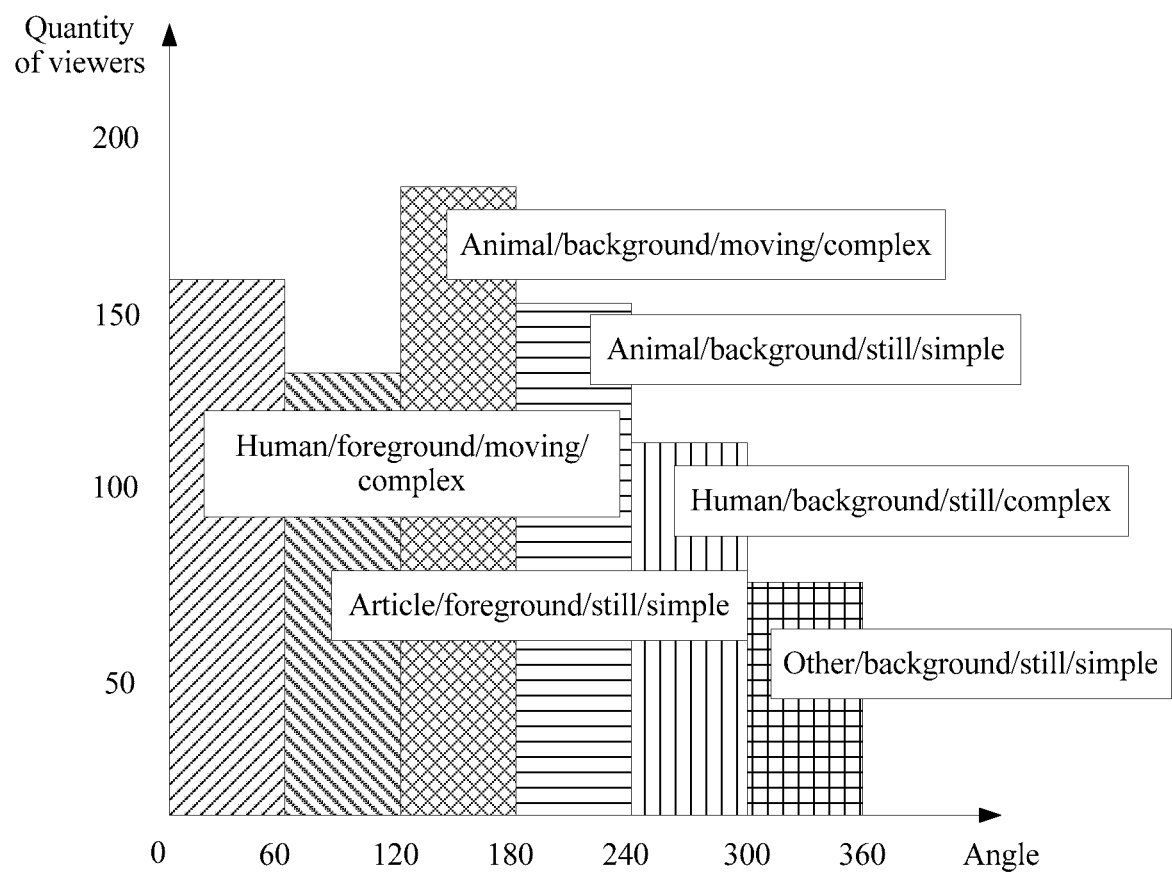
FIG. 6a is a first schematic flowchart of a locating information presentation manner according to an embodiment of the present invention.

When the locating information is presented by using a diagram, for example, the locating information includes the image information of and the total quantity of viewers of the playing content in each angle range, and the locating information may be a frequency histogram shown in FIG. 6a. The frequency histogram represents the total quantity of viewers, and the image information of the playing content in each angle range may be marked on a corresponding location by using text description. If the locating information of the 360-degree panoramic video does not include the image information of the playing content in each angle range, corresponding text description may not be marked.

Figure 6B:
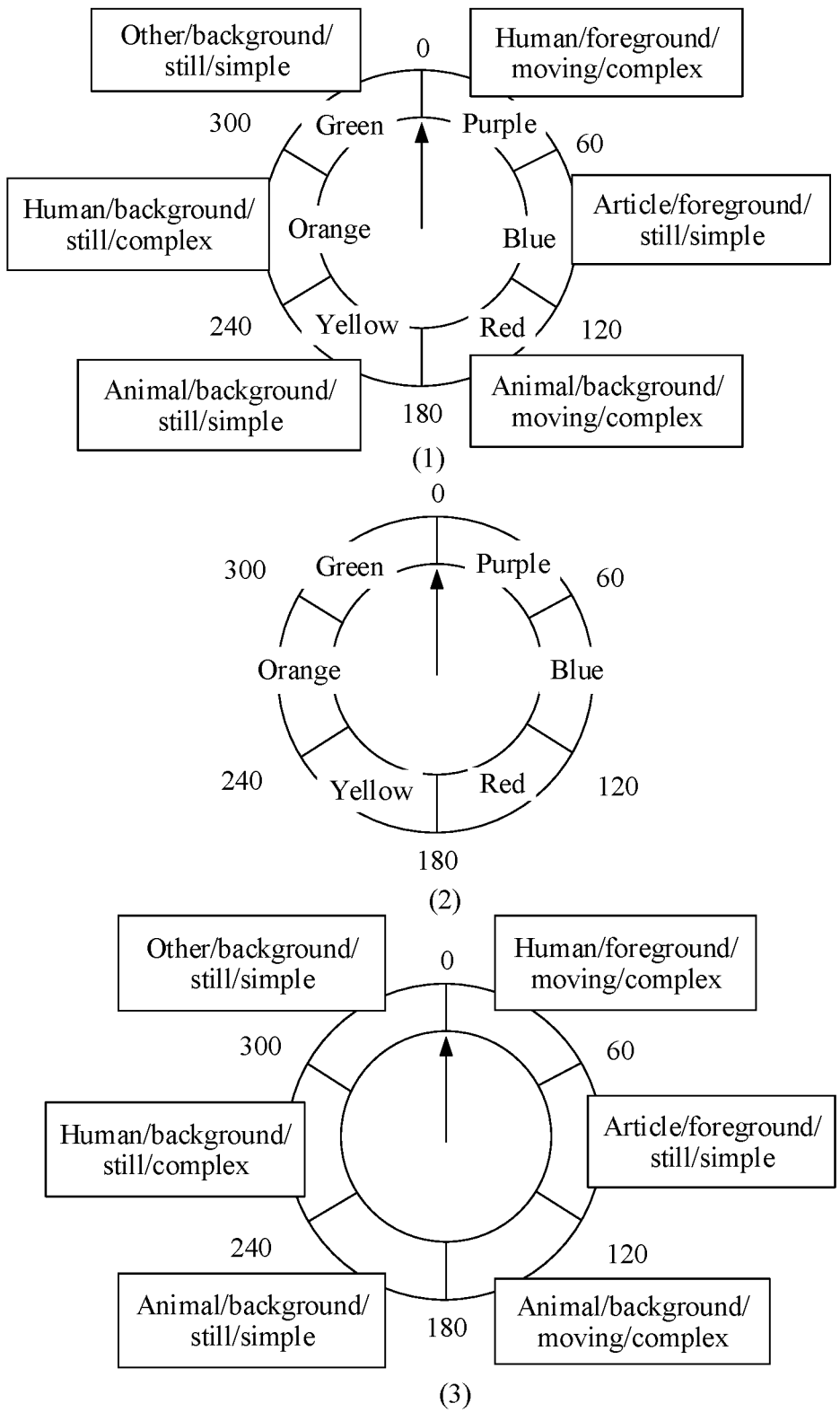
FIG. 6b is a second schematic flowchart of a locating information presentation manner according to an embodiment of the present invention.

When the locating information is presented by using a compass image, for example, the locating information includes the image information of and the total quantity of viewers of the playing content in each angle range, and the locating information may be a compass image shown in (1) in FIG. 6b. In an annulus of the compass image, each angle range is corresponding to a part of the annulus. Corresponding text description is marked on a corresponding part of the annulus, to represent image information of playing content in a corresponding angle range. In addition, relative magnitudes of total quantities of viewers corresponding to six angle ranges are represented by different colors, and a corresponding part of the annulus is filled with a corresponding color, so as to represent the relative magnitudes of the total quantities of viewers corresponding to the six angle ranges. For example, red represents a largest total quantity of viewers, and in the annulus shown in (1) in FIG. 6b, a part corresponding to an angle range 120°-180° is filled with red. Green represents a smallest total quantity of viewers, and in the annulus shown in (1) in FIG. 6b, a part corresponding to an angle range 300°-360° is filled with green. Therefore, the user may determine, according to the colors, an angle range with playing content that is viewed by a largest total quantity of viewers.

If the locating information includes the total quantity of viewers of the playing content in each angle range, the locating information may be a compass image shown in (2) in FIG. 6b. A corresponding part of the annulus is filled with a corresponding color, to represent relative magnitudes of total quantities of viewers corresponding to the six angle ranges.

If the locating information includes the image information of the playing content in each angle range, the locating information may be a compass image shown in (3) in FIG. 6b. Corresponding text description is marked on a corresponding part of the annulus, to represent image information of playing content in a corresponding angle range.

When the locating information is presented by using words, a correspondence between each angle range and the image information of the playing content and/or the total quantity of viewers may be directly described by using words. For example, if the locating information includes the image information of and the total quantity of viewers of the playing content in each angle range, the locating information may be a text list shown in FIG. 6c.

It may be understood that, if the locating information is presented in the foregoing three manners, during display, the locating information may further be translucently displayed on the current playing content by means of superimposition.

When the locating information is presented by using a thumbnail, and the locating information includes the image information of the playing content in each angle range, the locating information may be a panoramic thumbnail shown in (1) in FIG. 6d, or the locating information may be a thumbnail that is shown in (2) in FIG. 6d and that is obtained by simplifying background and reserving important images (such as a human image, an animal image, and a foreground image). By means of simplifying the background, memory occupied by the thumbnail can be reduced, and memory resources can be saved. Alternatively, the locating information may be a thumbnail that is shown in (3) in FIG. 6d and that is obtained by means of further simplifying and by reserving only important images (such as a human image, an animal image, and a foreground image), so as to further reduce memory occupied by the thumbnail, that is, further save memory resources.

S103. The video player receives a switching instruction, where the switching instruction is used to instruct the video player to switch a playing angle of the 360-degree panoramic video from an angle range of current playing content to a first angle range, and the first angle range is an angle range selected by the user from the multiple angle ranges.

In an example, by clicking on a location corresponding to a first angle range in the locating information, the user can input the switching instruction. After receiving the switching instruction, the video player may determine, according to a location on which the switching instruction is detected, an angle range that is in the locating information and to which the first angle range to which the user wants to switch belongs.

For example, it is assumed that the locating information is presented by using the compass image. When the user wants to switch the playing angle range to the angle range 180°-240°, the user may click on the red area of the compass image shown in (1) in FIG. 6b, or may click on the text description corresponding to the angle range 180°-240° to input the switching instruction. Therefore, after detecting the switching instruction in the red area of the compass image or in an area in which the text description corresponding to the angle range 180°-240° is located, the video player can determine, according to the location on which the switching instruction is detected, that the first angle range is the angle range 180°-240°.

S104. The video player switches the playing angle range of the 360-degree panoramic video from the angle range of the current playing content to the first angle range according to the switching instruction.

It should be noted that based on the 360-degree panoramic video playing method provided in this embodiment of the present invention, when receiving the search instruction, the video player may display the locating information to the user. The locating information includes the descriptive information of the playing content in the multiple angle ranges of the 360-degree panoramic video, so that the user can determine the playing content in the multiple angle ranges according to the descriptive information of the playing content in the multiple angle ranges, and after receiving the switching instruction input by the user, the video player can directly switch the playing angle range of the 360-degree panoramic video from the angle range of the current playing content to the first angle range, that is, can directly switch the current playing angle range to the first angle range with the playing content in which the user is interested, while the user neither needs to drag a picture of the 360-degree panoramic video by using a mouse to select the playing angle range in which the user is interested, nor needs to switch the playing angle range to all viewpoints one by one. The playing angle range is selected by browsing the playing content, so that efficiency of switching the playing angle range by the user is improved.

Figure 4B:
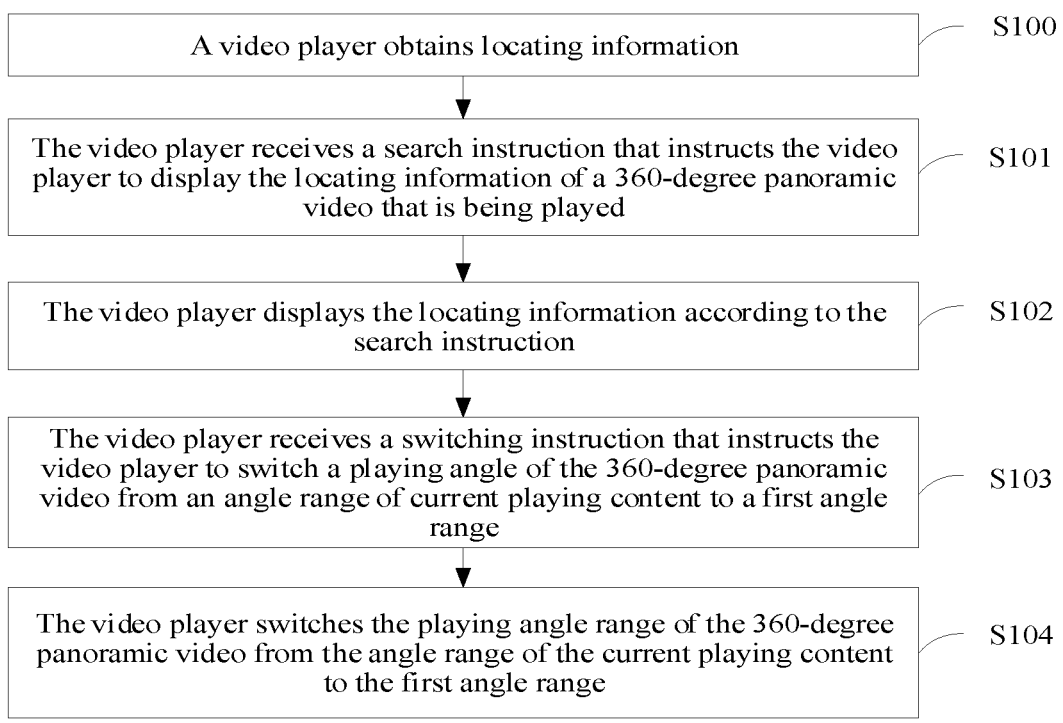
FIG. 4b is a second flowchart of a 360-degree panoramic video playing method according to an embodiment of the present invention.

Further, based on FIG. 4a, as shown in FIG. 4b, before S101, the method further includes the following steps.

S100. The video player obtains the locating information.

Specifically, this embodiment of the present invention provides two locating information obtaining manners. A first locating information obtaining manner is: A video server performs a series of processing on the 360-degree panoramic video to obtain the locating information, and sends the locating information to the video player; and a second locating information obtaining manner is: The video player directly performs a series of processing on the 360-degree panoramic video to obtain the locating information.

Figure 7:
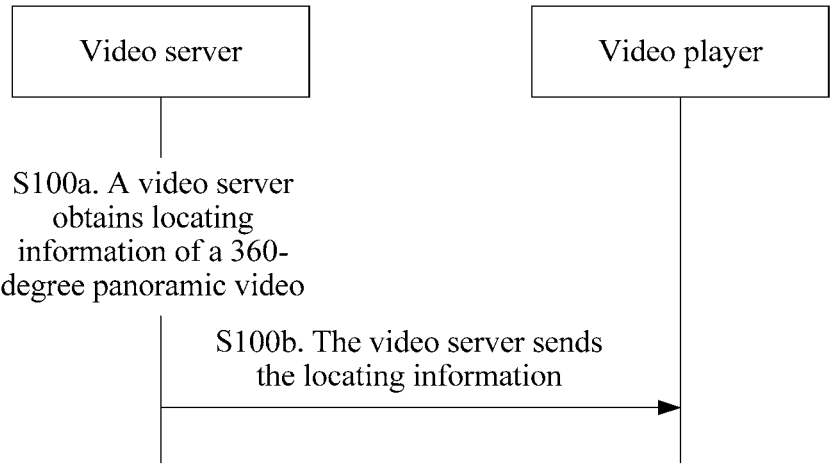
FIG. 7 is an interaction diagram of a locating information obtaining method according to an embodiment of the present invention.

For example, the first locating information obtaining manner may be shown in FIG. 7. When the first locating information obtaining manner is used, S100 may be specifically implemented by performing steps shown in FIG. 7. Specifically, the first locating information obtaining manner includes the following steps.

S100a. A video server obtains locating information of the 360-degree panoramic video.

In an example, when the video server needs to obtain the locating information of the 360-degree panoramic video, the video server may first perform angle range division on the 360-degree panoramic video, and determine the playing content in the multiple angle ranges. Then, when the locating information includes the image information of the playing content in each angle range, the video server performs image processing on the playing content in the multiple angle ranges, and obtains the image information of the playing content in each angle range, to obtain the locating information.

The performing image processing on the playing content in the multiple angle ranges may include: processing each frame of image or several frames of images included in the playing content in each angle range by using various image processing algorithms such as a saliency detection algorithm, a foreground and background separation algorithm, a human detection algorithm, an article detection algorithm, and an animal detection algorithm, so as to determine picture information such as whether the playing content in each angle range is a foreground image or a background image, whether there is a human, an animal and/or an article, whether the playing content is a moving picture or a still picture, or whether the playing content is an image of complex textures or an image of simple textures, and directly use the picture information as the image information.

Optionally, after the picture information is determined, the image information may further be calculated by using a value. A score of the playing content in each angle range is calculated according to a preset weight coefficient, and the calculated score is determined as the image information.

When the locating information includes the total quantity of viewers of the playing content in each angle range, the video server may count the viewers of the playing content in each angle range, to obtain the locating information. For example, each time one more user views the 360-degree panoramic video, the video server updates the total quantity of viewers of the playing content in each angle range once, uses the updated total quantity of viewers as the locating information, and sends the locating information to a next new video player that requests to play the 360-degree panoramic video.

S100b. The video server sends the locating information to the video player.

In an example, the video server may send the locating information to the video player, that is, separately sends video stream information of the 360-degree panoramic video and the locating information to the video player.

Optionally, alternatively, the video server may encode the locating information into the video stream information of the 360-degree panoramic video, and send the locating information to the video player together with the video stream information of the 360-degree panoramic video.

Figure 8:
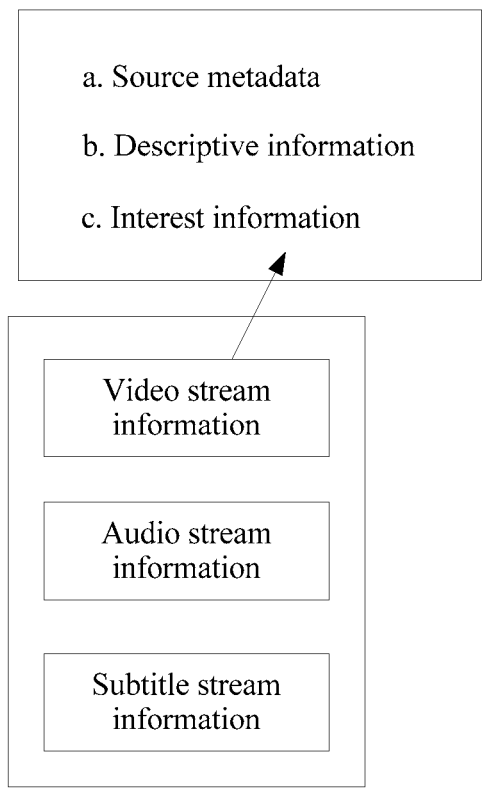
FIG. 8 is a schematic diagram of a locating information encoding manner according to an embodiment of the present invention.

For example, as shown in FIG. 8, the 360-degree panoramic video includes video stream information, subtitle stream information, and audio stream information. The video stream information includes source metadata (source metadata) and descriptive information (descriptive information). In this case, the video server may add a piece of interest information (interest information) to the video stream information, to encode the locating information into the interest information.

When receiving the video stream information of the 360-degree panoramic video, the video player may obtain the locating information when decoding the video stream information.

Optionally, when the descriptive information of the playing content in the multiple angle ranges includes the image information of the playing content in each of the multiple angle ranges, the video player may further voluntarily obtain the locating information in the second locating information obtaining manner. That is, the video player performs angle range division on the 360-degree panoramic video, and determines the playing content in the multiple angle ranges; and then performs image processing on the playing content in the multiple angle ranges, and obtains the image information of the playing content in each angle range, to obtain the locating information.

A manner in which the video player performs image processing on the playing content in the multiple angle ranges, and obtains the image information of the playing content in each angle range is the same as the foregoing manner in which the video server performs image processing on the playing content in the multiple angle ranges, and obtains the image information of the playing content in each angle range, and details are not described herein again.

The foregoing has mainly described the solution provided in the embodiments of the present invention from a perspective of interaction between network elements. It may be understood that each network element, such as the video server and the video player, includes a corresponding hardware structure and/or software module for performing each function, so as to implement the foregoing functions. A person skilled in the art may easily be aware that, with reference to the examples described in the embodiments disclosed in this specification, units and algorithm steps may be implemented in a form of hardware or a combination of hardware and computer software in the present invention. Whether a function is performed by hardware or hardware driven by computer software depends on particular applications and design constraint conditions of the technical solution. A person skilled in the art may use different methods to implement the described functions for each particular application, but it should not be considered that the implementation goes beyond the scope of the present invention.

In the embodiments of the present invention, function modules of the video server and the video player may be divided according to the examples in the foregoing method. For example, each function module may be divided for each corresponding function, or two or more functions may be integrated into one processing module. The integrated module may be implemented in a form of hardware, or may be implemented in a form of a software function module. It should be noted that module division in the embodiments of the present invention is merely an example, and is merely logical function division, and may be other division in actual implementation.

Figure 9A:
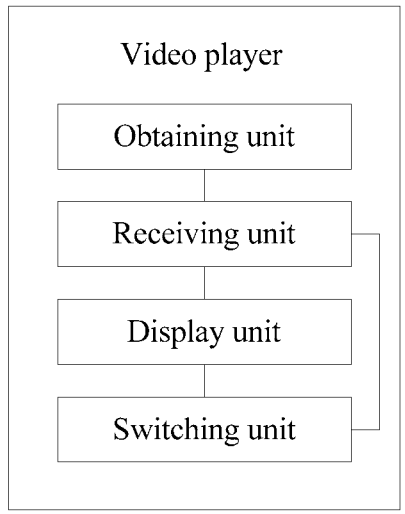
FIG. 9A is a second schematic structural diagram of a video player according to an embodiment of the present invention.

FIG. 9A shows a possible schematic structural diagram of the video player used in the foregoing embodiment when each function module is divided for each corresponding function. The video player includes an obtaining unit, a receiving unit, a display unit, and a switching unit. The obtaining unit is configured to support the video player in performing a process S100 in FIG. 4b. The receiving unit is configured to support the video player in performing processes S101 and S103 in FIG. 4a and FIG. 4b, and performing a process S100b in FIG. 7. The display unit is configured to support the video player in performing processes S102 in FIG. 4a and FIG. 4b. The switching unit is configured to support the video player in performing processes S104 in FIG. 4a and FIG. 4b. All related content of all steps performed in the method embodiment may be cited as function description of all corresponding function modules, and details are not described herein again.

Figure 9B:
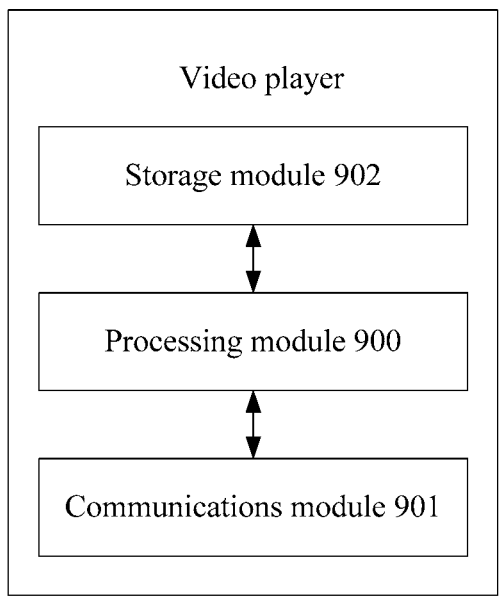
FIG. 9B is a third schematic structural diagram of a video player according to an embodiment of the present invention.

FIG. 9B shows a possible schematic structural diagram of the video player used in the foregoing embodiment when an integrated unit is used. The video player includes a processing module 900 and a communications module 901. The processing module 900 is configured to control and manage an action of the video player. For example, the processing module 900 is configured to support the video player in performing processes S101 to S104 in FIG. 4a, processes S100 to S104 in FIG. 4b, and a process S100b in FIG. 7, and/or is configured to perform another process of the technology described in this specification. The communications module 901 is configured to support the video player in communicating with another network entity, for example, communicating with a function module or a network entity shown in FIG. 1. The video player may further include a storage module 902, configured to store program code and data of the video player.

The processing module 900 may be a processor or a controller, for example, may be a central processing unit (Central Processing Unit, CPU), a general purpose processor, a DSP, an ASIC, an FPGA, or another programmable logic device, a transistor logic device, a hardware component, or any combination thereof. The processing module 900 may implement or perform a logic block, a module, and a circuit that are described as examples in content disclosed in the present invention. Alternatively, the processor may be a combination that implements a calculation function, for example, includes a combination of one or more microprocessors, a combination of a DSP and a microprocessor, or the like. The communications module 901 may be a transceiver, a transceiver circuit, a communications interface, or the like. The storage module 902 may be a memory.

Figure 9C:
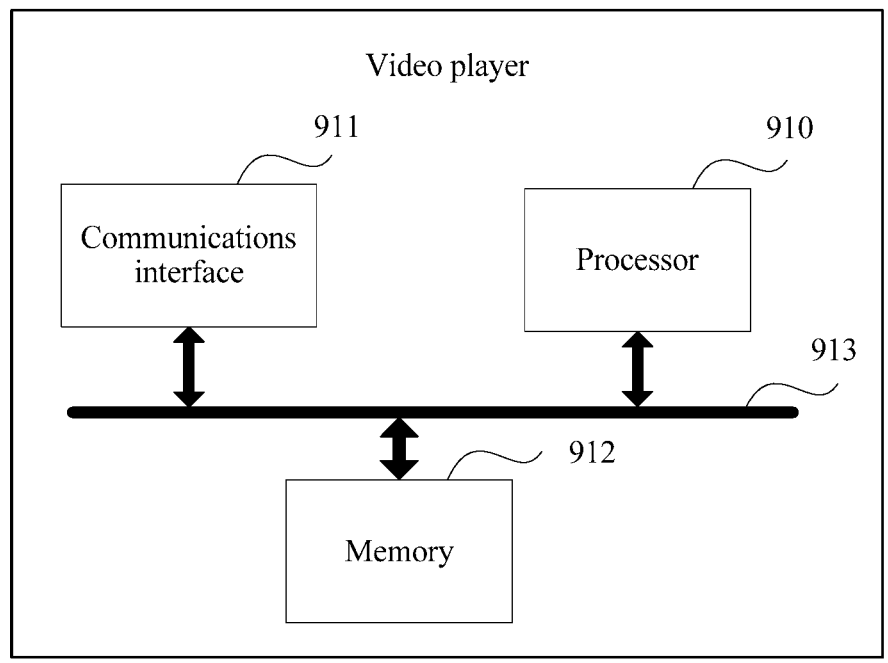
FIG. 9C is a fourth schematic structural diagram of a video player according to an embodiment of the present invention.

When the processing module 900 is a processor, the communications module 901 is a communications interface, and the storage module 902 is a memory, the video player used in the embodiments of the present invention may be a video player shown in FIG. 9C.

Referring to FIG. 9C, the video player includes: a processor 910, a communications interface 911, a memory 912, and a bus 913. The communications interface 911, the processor 910, and the memory 912 are interconnected by using the bus 913. The bus 913 may be a peripheral component interconnect (Peripheral Component Interconnect, PCI for short) bus, an extended industry standard architecture (Extended Industry Standard Architecture, EISA) bus, or the like. The bus may be classified into an address bus, a data bus, a control bus, and the like. For ease of representation, the bus is represented by using only one thick line in FIG. 9C for representation, but it does not indicate that there is only one bus or one type of bus.

Figure 10A:
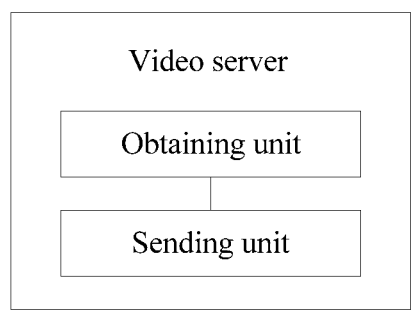
FIG. 10A is a second schematic structural diagram of a video server according to an embodiment of the present invention.

FIG. 10A shows a possible schematic structural diagram of the video server used in the foregoing embodiment when each function module is divided for each corresponding function. The video server includes an obtaining unit and a sending unit. The obtaining unit is configured to support the video server in performing a process S100a in FIG. 7. The sending unit is configured to support the video server in performing a process S100b in FIG. 7. All related content of all steps performed in the method embodiment may be cited as function description of all corresponding function modules, and details are not described herein again.

Figure 10B:
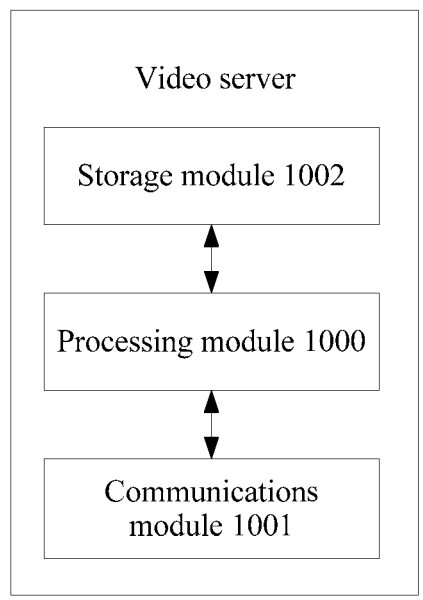
FIG. 10B is a third schematic structural diagram of a video server according to an embodiment of the present invention.

FIG. 10B shows a possible schematic structural diagram of the video server used in the foregoing embodiment when an integrated unit is used. The video server includes a processing module 1000 and a communications module 1001. The processing module 1000 is configured to control and manage an action of the video server. For example, the processing module 1000 is configured to support the video server in performing processes S100a to S100b in FIG. 7, and/or is configured to perform another process of the technology described in this specification. The communications module 1001 is configured to support the video server in communicating with another network entity, for example, communicating with a function module or a network entity shown in FIG. 1. The video server may further include a storage module 1002, configured to store program code and data of the video server.

The processing module 1000 may be a processor or a controller, for example, may be a CPU, a general purpose processor, a DSP, an ASIC, an FPGA, or another programmable logic device, a transistor logic device, a hardware component, or any combination thereof. The processing module 1000 may implement or perform a logic block, a module, and a circuit that are described as examples in content disclosed in the present invention. Alternatively, the processor may be a combination that implements a calculation function, for example, includes a combination of one or more microprocessors, a combination of a DSP and a microprocessor, or the like. The communications module 1001 may be a communications interface, a transceiver circuit, a transceiver, or the like. The storage module 1002 may be a memory.

Figure 10C:
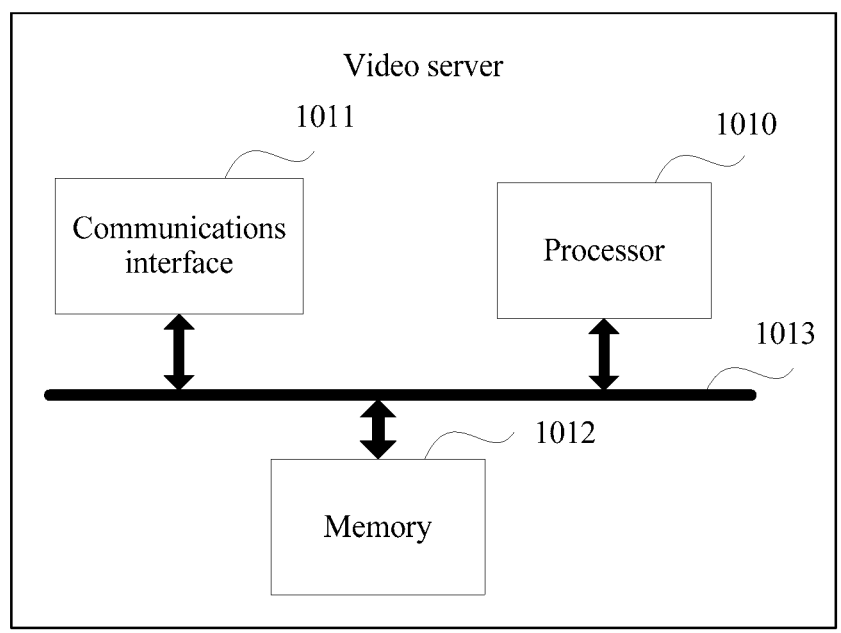
FIG. 10C is a fourth schematic structural diagram of a video server according to an embodiment of the present invention.

When the processing module 1000 is a processor, the communications module 1001 is a communications interface, and the storage module 1002 is a memory, the video server used in the embodiments of the present invention may be a video server shown in FIG. 10C.

Referring to FIG. 10C, the video server includes: a processor 1010, a communications interface 1011, a memory 1012, and a bus 1013. The communications interface 1011, the processor 1010, and the memory 1012 are interconnected by using the bus 1010. The bus 1013 may be a PCI bus, an EISA bus, or the like. The bus may be classified into an address bus, a data bus, a control bus, and the like. For ease of representation, the bus is represented by using only one thick line in FIG. 10C, but it does not indicate that there is only one bus or one type of bus.

Steps in the methods or the algorithms described in content disclosed in the present invention may be implemented in a form of hardware, or may be implemented by the processor by executing a software instruction. The software instruction may include corresponding software modules. The software modules may be stored in a random access memory (Random Access Memory, RAM), a flash memory, a read-only memory (Read Only Memory, ROM), an erasable programmable read only memory (Erasable Programmable ROM, EPROM), an electrically erasable programmable read only memory (Electrically EPROM, EEPROM), a register, a hard disk, a USB flash drive, a compact disc read-only memory (CD-ROM), or a storage medium in any other form known in the art. For example, the storage medium is coupled to the processor, so that the processor may read information from the storage medium, and may write information into the storage medium. Certainly, the storage medium may be a component of the processor. The processor and the storage medium may be located in an ASIC. In addition, the ASIC may be located in a core network interface device. Certainly, alternatively, the processor and the storage medium may exist in the core network interface device as discrete components.

This embodiment further provides a storage medium, including a computer readable instruction. When a processor of a video player executes the computer readable instruction, the video player performs the 360-degree panoramic video playing method described in FIG. 4a or FIG. 4b. The storage medium may include the memory 912.

This embodiment further provides another storage medium, including a computer readable instruction. When a processor of a video server executes the computer readable instruction, the video server performs the 360-degree panoramic video playing method described in FIG. 7. The storage medium may include the memory 1012.

An embodiment of the present invention provides a video playing system, which may be shown in FIG. 1. The video playing system includes the video player shown in FIG. 9A, FIG. 9B, or FIG. 9C, and the video server shown in FIG. 10A, FIG. 10B, or FIG. 10C.

When receiving a search instruction, the video player may display the locating information to a user. The locating information includes descriptive information of playing content in multiple angle ranges of the 360-degree panoramic video, so that the user can determine the playing content in the multiple angle ranges according to the descriptive information of the playing content in the multiple angle ranges, and after receiving a switching instruction input by the user, the video player can directly switch a playing angle range of the 360-degree panoramic video from an angle range of current playing content to a first angle range, that is, can directly switch the current playing angle range to the first angle range with playing content in which the user is interested, while the user neither needs to drag a picture of the 360-degree panoramic video by using a mouse to select the playing angle range in which the user is interested, nor needs to switch the playing angle range to all viewpoints one by one. The playing angle range is selected by browsing the playing content, so that efficiency of switching the playing angle range by the user is improved.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, function units in the embodiments of the present invention may be integrated into one processing unit, or each of the units may exist alone physically, or two or more units are integrated into one unit. The integrated unit may be implemented in a form of a software function unit.

When the integrated unit is implemented in the form of a software function unit and sold or used as an independent product, the integrated unit may be stored in a computer-readable storage medium. Based on such an understanding, all or parts of the technical solutions may be implemented in a form of a software product. The computer software product is stored in a storage medium, and includes several instructions for instructing a computer device (which may be a personal computer, a server, or a network device) or a processor to perform all or some of the steps of the methods described in the embodiments of the present invention. The storage medium is a non-transitory (English: non-transitory) medium, and includes any medium that can store program code, such as a flash memory, a removable hard disk, a read-only memory, a random access memory, a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The foregoing descriptions about embodiments allow a person skilled in the art to understand that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A 360-degree panoramic video playing method, wherein the method comprises:
   receiving, by a video player and during playing of a 360-degree panoramic video by the video player, a search instruction instructing the video player to display locating information of the 360-degree panoramic video, wherein:
      the locating information comprises descriptive information of playing content in multiple angle ranges of the 360-degree panoramic video,
      the descriptive information is used for determining the playing content in the multiple angle ranges, and
      the descriptive information (1) includes one or more of image information of playing content in each of the multiple angle ranges that is descriptive of a particular image of the playing content in the angle range and (2) is distinct from the playing content in each of the multiple angle ranges;
   in response the search instruction, displaying, by the video player, the locating information, wherein the displayed locating information comprises a total quantity of viewers of the playing content in each corresponding angle range of the multiple angle ranges of the 360-degree panoramic video;
   receiving, by the video player, a switching instruction that instructs the video player to switch a playing angle range of the 360-degree panoramic video from an angle range of current playing content to a first angle range, and the first angle range is an angle range selected by a user from the multiple angle ranges; and
   switching, by the video player and without manually dragging the current playing content, the playing angle range of the 360-degree panoramic video directly from the angle range of the current playing content to the first angle range according to the switching instruction.

2. The method according to claim 1, wherein the displaying, by the video player, the locating information according to the search instruction comprises:
   displaying, by the video player according to the search instruction, the locating information on the current playing content by superimposition.

3. The method according to claim 1, wherein before the receiving, by a video player, a search instruction, the method further comprises:
   obtaining, by the video player, the locating information.

4. The method according to claim 3, wherein the obtaining, by the video player, the locating information comprises:
   receiving, by the video player, the locating information sent by a video server.

5. The method according to claim 3, wherein the descriptive information of the playing content in the multiple angle ranges comprises the image information of the playing content in each of the multiple angle ranges; and
   wherein obtaining, by the video player, the locating information comprises:
      performing, by the video player, angle range division on the 360-degree panoramic video;
      determining the playing content in the multiple angle ranges;
      performing, by the video player, image processing on the playing content in the multiple angle ranges; and
      obtaining the image information of the playing content in each angle range to obtain the locating information.

6. A 360-degree panoramic video playing method, wherein the method comprises:
   obtaining, by a video server, locating information of a 360-degree panoramic video, wherein:
      the locating information comprises descriptive information of playing content in multiple angle ranges of the 360-degree panoramic video,
      the descriptive information is used for determining the playing content in the multiple angle ranges, and
      the descriptive information (1) includes one or more of image information of playing content in each of the multiple angle ranges that is descriptive of a particular image of the playing content in the angle range and (2) is distinct from the playing content in each of the multiple angle ranges; and
   sending, by the video server, the locating information to a video player, wherein the locating information is to be displayed by the video player to a user in a process of playing the 360-degree panoramic video and receiving the user's selection of a playing angle range of the 360-degree panoramic video, and wherein the locating information further comprises a total quantity of viewers of the playing content in each corresponding angle range of the multiple angle ranges of the 360-degree panoramic video.

7. The method according to claim 6, wherein the descriptive information of the playing content in the multiple angle ranges comprises the image information of the playing content in each angle range; and
   wherein obtaining, by a video server, locating information of a 360-degree panoramic video comprises:
      performing, by the video server, angle range division on the 360-degree panoramic video;
      determining the playing content in the multiple angle ranges; performing, by the video server, image processing on the playing content in the multiple angle ranges; and
      obtaining the image information of the playing content in each angle range to obtain the locating information.

8. The method according to claim 6, wherein the descriptive information of the playing content in the multiple angle ranges comprises the total quantity of viewers that select to view the playing content in each angle range; and wherein obtaining, by a video server, locating information of a to-be-played 360-degree panoramic video comprises:
  performing, by the video server, the angle range division on the 360-degree panoramic video; and
  counting, by the video server, the viewers of the playing content in each angle range, to obtain the locating information.

9. A video player, comprising one or more processors and a non-transitory computer-readable storage medium coupled to the at least one processor and storing programming instructions for execution by the at least one processor, wherein the programming instructions instruct the at least one processor to perform operations comprising:
  receiving, by a video player and during playing of a 360-degree panoramic video by the video player, a search instruction instructing the video player to display locating information of the 360-degree panoramic video, wherein:
    the locating information comprises descriptive information of playing content in multiple angle ranges of the 360-degree panoramic video,
    the descriptive information is used for determining the playing content in the multiple angle ranges, and
    the descriptive information (1) includes one or more of image information of playing content in each of the multiple angle ranges that is descriptive of a particular image of the playing content in the angle range and (2) is distinct from the playing content in each of the multiple angle ranges;
  in response the search instruction, displaying, by the video player, the locating information, wherein the displayed locating information comprises a total quantity of viewers of the playing content in each corresponding angle range of the multiple angle ranges of the 360-degree panoramic video;
  receiving, by the video player, a switching instruction that instructs the video player to switch a playing angle range of the 360-degree panoramic video from an angle range of current playing content to a first angle range, and the first angle range is an angle range selected by a user from the multiple angle ranges; and
  switching, by the video player and without manually dragging the current playing content, the playing angle range of the 360-degree panoramic video directly from the angle range of the current playing content to the first angle range according to the switching instruction.

10. The video player according to claim 9, wherein the operations further comprise:
  displaying, by the video player according to the search instruction, the locating information on the current playing content by means of superimposition.

11. The video player according to claim 9, wherein the operations further comprise: obtaining, by the video player, the locating information.

12. The video player according to claim 11, wherein the operations further comprise: receiving, by the video player, the locating information sent by a video server.

13. The video player according to claim 11, wherein the descriptive information of the playing content in the multiple angle ranges comprises the image information of the playing content in each of the multiple angle ranges; and the operations further comprise:
  performing, by the video player, angle range division on the 360-degree panoramic video;
  determining the playing content in the multiple angle ranges;
  performing, by the video player, image processing on the playing content in the multiple angle ranges; and
  obtaining the image information of the playing content in each angle range to obtain the locating information.

14. A video server, comprising one or more processors and a non-transitory computer-readable storage medium coupled to the at least one processor and storing programming instructions for execution by the at least one processor, wherein the programming instructions instruct the at least one processor to perform operations comprising:
  obtaining, by a video server, locating information of a 360-degree panoramic video, wherein:
    the locating information comprises descriptive information of playing content in multiple angle ranges of the 360-degree panoramic video,
    the descriptive information is used for determining the playing content in the multiple angle ranges, and
    the descriptive information (1) includes one or more of image information of playing content in each of the multiple angle ranges that is descriptive of a particular image of the playing content in the angle range and (2) is distinct from the playing content in each of the multiple angle ranges; and
  sending, by the video server, the locating information to a video player, wherein the locating information is to be displayed by the video player to a user in a process of playing the 360-degree panoramic video and receiving the user's selection of a playing angle range of the 360-degree panoramic video, and wherein the locating information further comprises a total quantity of viewers of the playing content in each corresponding angle range of the multiple angle ranges of the 360-degree panoramic video.

15. The video server according claim 14, wherein the descriptive information of the playing content in the multiple angle ranges comprises the image information of the playing content in each angle range; and
  the operations further comprise:
  performing, by the video server, angle range division on the 360-degree panoramic video;
  determining the playing content in the multiple angle ranges; performing, by the video server, image processing on the playing content in the multiple angle ranges; and obtaining the image information of the playing content in each angle range to obtain the locating information.

16. The video server according claim 14, wherein the descriptive information of the playing content in the multiple angle ranges comprises the total quantity of viewers that select to view the playing content in each angle range; and
  the operations further comprise:
  performing, by the video server, the angle range division on the 360-degree panoramic video; and
  counting, by the video server, the viewers of the playing content in each angle range, to obtain the locating information.

17. A non-transitory storage medium, comprising computer-readable instructions when read by one or more processors cause the one or more processors to perform operations comprising:
  receiving, by a video player and during playing of a 360-degree panoramic video by the video player, a search instruction instructing the video player to display locating information of the 360-degree panoramic video, wherein:

the locating information comprises descriptive information of playing content in multiple angle ranges of the 360-degree panoramic video,
the descriptive information is used for determining the playing content in the multiple angle ranges, and
the descriptive information (1) includes one or more of image information of playing content in each of the multiple angle ranges that is descriptive of a particular image of the playing content in the angle range and (2) is distinct from the playing content in each of the multiple angle ranges;
in response the search instruction, displaying, by the video player, the locating information, wherein the displayed locating information comprises a total quantity of viewers of the playing content in each corresponding angle range of the multiple angle ranges of the 360-degree panoramic video;
receiving, by the video player, a switching instruction that instructs the video player to switch a playing angle range of the 360-degree panoramic video from an angle range of current playing content to a first angle range, and the first angle range is an angle range selected by a user from the multiple angle ranges; and
switching, by the video player and without manually dragging the current playing content, the playing angle range of the 360-degree panoramic video directly from the angle range of the current playing content to the first angle range according to the switching instruction.

* * * * *